Sept. 8, 1959      J. J. DIGBY      2,902,864
ENGINE STARTER DRIVES
Filed Jan. 2, 1958      2 Sheets-Sheet 1
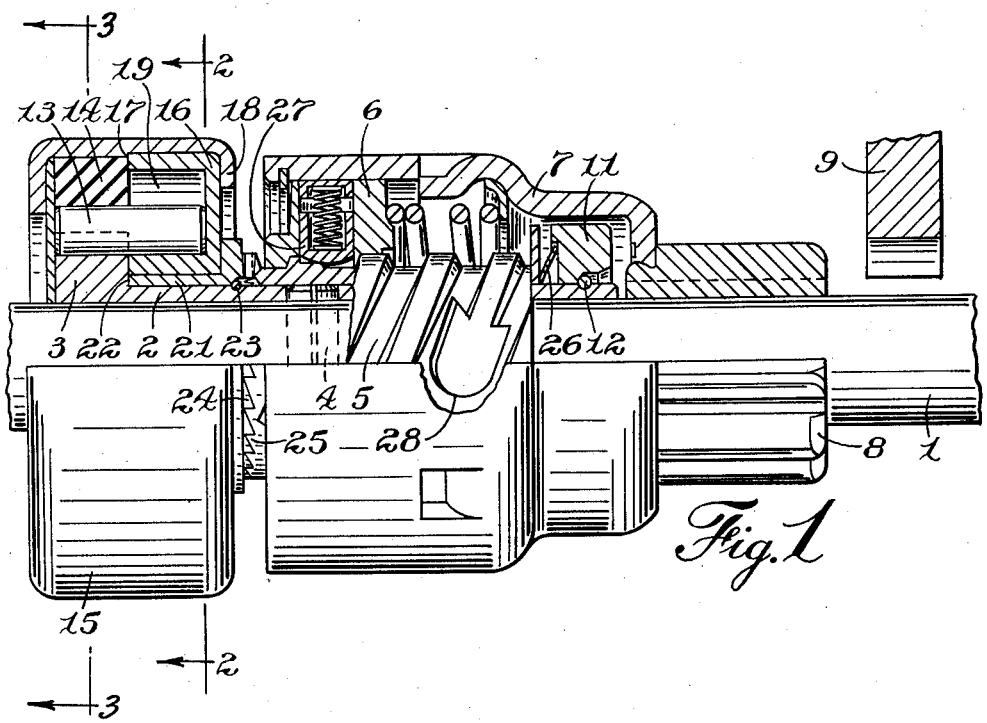
INVENTOR.
James J. Digby Sept. 8, 1959    J. J. DIGBY    2,902,864
ENGINE STARTER DRIVES Filed Jan. 2, 1958    2 Sheets-Sheet 2

WITNESS:
Esther M. Stockton

INVENTOR.
James J. Digby
BY Clinton L. James
ATTORNEY

2,902,864
ENGINE STARTER DRIVES

James J. Digby, Elmira, N.Y., assignor to Bendix Aviation Corporation, Elmira Heights, N.Y., a corporation of Delaware Application January 2, 1958, Serial No. 706,622

4 Claims. (Cl. 74—7)

The present invention relates to engine starter drives and more particularly to a drive having cushioned coupling means which are adapted to slip when subjected to predetermined overload.

It is an object of the present invention to provide a novel drive of this type which is simple in construction, quiet in operation and durable in service.

It is another object to provide such a device which is small in size but is capable of transmitting heavy torque loads without excessive localized unit pressures.

It is another object to provide such a device in which the torque transmitted through the slip coupling is divided among a plurality of coupling elements, and means are provided for substantially equalizing the loads on said elements.

It is another object to provide such a device incorporating frictional damping means for the coupling member.

Further objects and advantages will be apparent from the following description taken in connection with the accompanying drawing in which:

Fig. 1 is a side elevation partly broken away and in section of a preferred embodiment of the invention showing the parts in idle position;

Fig. 2 is a section taken substantially on the line 2—2 of Fig. 1; and

Figure 3:
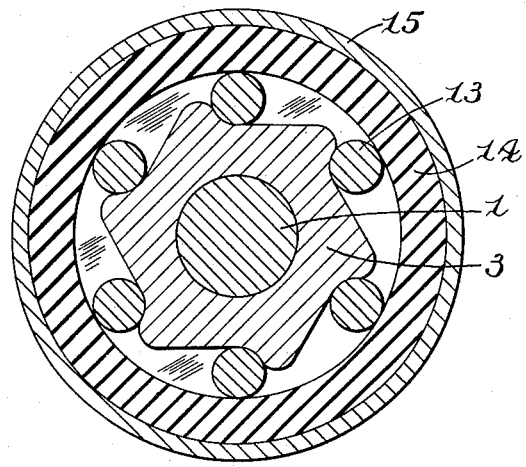
Fig. 3 is a section taken substantially on the line 3—3 of Fig. 1.

In Fig. 1 of the drawing there is illustrated a power shaft 1 on which a sleeve 2 comprising a driving multiple cam portion 3 is rigidly mounted as by means of a pin 4.

A screw shaft 5 is slidably journalled on the sleeve 2, and a control nut 6 threaded thereon is connected by a barrel member 7 to a pinion 8 adapted to be moved into and out of mesh with an engine gear 9. A stop ring 11 is fixedly mounted on the end of a sleeve 2 by means of a lock ring 12 and serves to limit the movement of the screw shaft 5 and of the control nut 6 in the meshing direction.

A plurality of connecting elements 13 in the form of pins are arranged axially and spaced about the cam member 3 as best shown in Fig. 2. These connecting elements are maintained in contact with the cam member 3 by means of a surrounding ring 14 of elastically deformable material which is confined by suitable means such as a sleeve 15 surrounding said ring. A driven coupling member 16 is also mounted within the sleeve 15 between an internal shoulder 17 therein and an end flange 18. This coupling member is provided with equally spaced axial slots 19 arranged divergently and adapted to slidably receive the ends of the connecting pins 13. The inclination of the slots 19 is preferably arranged as shown in Fig. 2 in such manner that when the cranking load is transmitted through the pins 13 in the direction of the arrow, the radial movement of the connecting pins is resisted. The driven coupling member 16 is seated on an overrunning clutch member 21 which is journalled on the sleeve 2 between a shoulder 22 and a lock ring 23 on said sleeve. The coupling member and clutch member are non-rotatably connected as by means of the "double Dee" section shown in Fig. 2.

Clutch member 21 has overrunning clutch teeth 24 adapted to cooperate with similar teeth 25 at the end of the screw shaft 5 to impart rotation thereto. The clutch teeth are normally held in engagement by a spring washer 26 interposed between the opposite end of the screw shaft 5 and the stop ring 11, and a spring loaded detent 27 mounted for radial movement in the control nut 6 serves to normally maintain the pinion and its associated parts in idle position or in cranking position by cooperating with suitably formed shoulders on the screw shaft.

In operation, rotation of the power shaft 1 causes the cam member 3 to be rotated in the direction of the arrow in Fig. 2, which rotation is transmitted through the connecting pins 13 to the coupling member 16, and from thence through the clutch member 21 to the screw shaft 5, causing the control nut 6 to move the pinion 8 into mesh with the engine gear 9. When the travel of the control nut 6 is arrested by the stop ring 11, the screw shaft 5 is wedged backwardly against the clutch member 21, forcing the clutch teeth 24, 25 into firm engagement. As torque is then built up, the radial cams of the member 3 wedge the connecting pins 13 outwardly against the resistance of the rubber ring 14, which radial movement is also resisted by reason of the circumferential inclination of the slots 19 in the coupling member 16. If the initial cranking load exceeds a predetermined limit, the connecting pins 13 will be wedged outwardly a sufficient distance to allow the cams to slip under the pins, such slippage continuing until the load is reduced below the predetermined torque limit. Thereafter, cranking proceeds, variations of load being cushioned by virtue of the rubber confining ring 14.

When the engine starts the acceleration of the pinion causes the parts to be returned to idle position as soon as the rotary speed of the barrel and control nut is sufficient to withdraw the detent member 27 from engagement with the shoulder 28 of the screw shaft by centrifugal force.

Although but one embodiment of the invention has been shown and described in detail it will be understood that changes may be made in the design and arrangement of the parts without departing from the spirit of the invention.

I claim:

1. In an engine starter drive a power shaft, a driving cam member fixedly mounted thereon, a screw shaft slidably and rotatably mounted on the power shaft, a control nut threaded on the screw shaft, a pinion slidably journalled on the power shaft for movement into and out of mesh with a gear of an engine to be started, a barrel member connecting the control nut to the pinion, a stop ring fixed with respect to the power shaft limiting the axial movement of the screw shaft and of the nut in the meshing direction, a plurality of connecting elements bearing on said cam member, yielding means resisting camming movement of the connecting elements, a driven coupling member rotatably mounted on the power shaft and coupled to the cam member by said connecting elements, and a clutch member non-rotatably connected to the driven coupling member having an overrunning clutch connection with said screw shaft.

2. An engine starter drive as set forth in claim 1 in which the driving member is formed with radially extending cams, and the yielding means for resisting camming movement of the connecting members comprises a ring of elastically deformable material surrounding the connecting elements and resisting their radial movement.

3. An engine starter drive as set forth in claim 2 in which the connecting elements are in the form of axially arranged pins maintained in contact with the radial cams of the driving member by said elastic ring, said driven coupling member having diverging slots slidably receiving said pins.

4. An engine starter drive as set forth in claim 3 in which the slots in the driven coupling member are inclined circumferentially in the direction to impose a resistance to radial movement of the connecting pins while under load.

No references cited.